United States Patent

[11] 3,575,294

| [72] | Inventors | Mamoru Hirowatari<br>Tokyo-to, Japan;<br>Takeo Kawai; Kangai Ito, Yokohama-shi, Japan |
|---|---|---|
| [21] | Appl. No. | 760,643 |
| [22] | Filed | Sept. 18, 1968 |
| [45] | Patented | Apr. 20, 1971 |
| [73] | Assignee | Nippon Rensui Kabushiki Kaisha (also known as Japan Water Treatment Services Company)<br>Tokyo-to, Japan |
| [32] | Priority | Nov. 27, 1967 |
| [33] | | Japan |
| [31] | | 42/75651 |

[54] COUNTERFLOW, MOVING BED TYPE, ION EXCHANGE APPARATUS
12 Claims, 5 Drawing Figs.

[52] U.S. Cl. ................................................ 210/189, 210/195, 210/259, 210/266, 210/268
[51] Int. Cl. ........................................................ B01d 15/02, B01d 33/16
[50] Field of Search ........................................... 210/33, 189, 195, 268

[56] References Cited
UNITED STATES PATENTS

| 2,572,848 | 10/1951 | Fitch | 210/33 |
| 2,767,140 | 10/1956 | Fitch | 210/33 |
| 3,193,498 | 7/1965 | Platzer et al. | 210/33 |
| 3,378,339 | 4/1968 | Yamashiki | 210/189X |

Primary Examiner—Samih N. Zaharna
Attorney—Ward, McElhannon, Brooks and Fitzpatrick ABSTRACT: In a counterflow moving bed type ion exchange apparatus in which an ion exchange resin is supplied to the upper portion of a column and a liquid being treated is supplied to the bottom of the column to flow upwardly through the moving resin bed, liquid jets are used to separate a predetermined quantity of the spent resin from the moving resin bed. The separated resin is circulated through a regenerating system including a washing column and a counterflow type regenerating column.

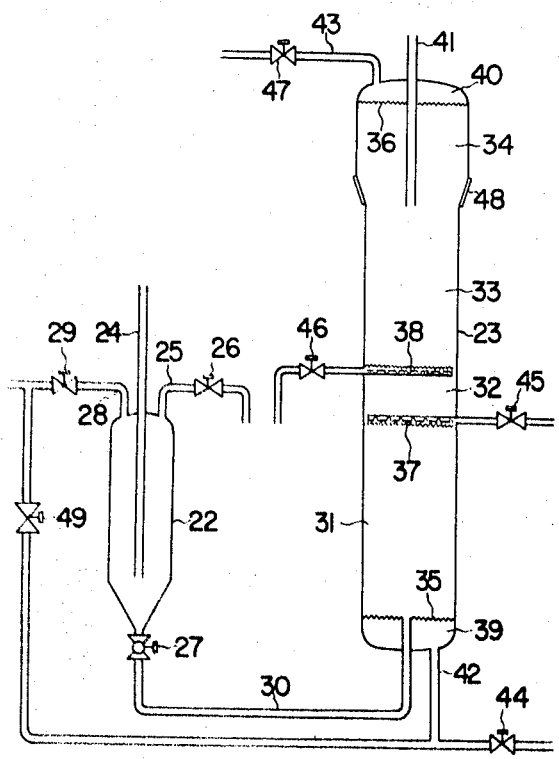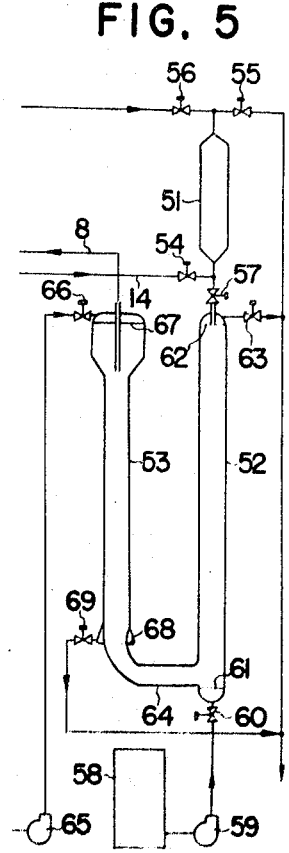

COUNTERFLOW, MOVING BED TYPE, ION EXCHANGE APPARATUS

BACKGROUND OF THE INVENTION

This invention relates to an ion exchange treating apparatus of the counterflow moving bed type and more particularly to improvements relating to an ion exchange treating apparatus advantageously operable to continuously treat a large quantity of liquid such as water, polar solvents having a specific gravity substantially equal to that of water, or a mixture of water and such polar solvents.

Although various methods of continuously performing ion exchange treatment have been proposed in the past, the so-called perfectly continuous method wherein the flow of the liquid being treated and ion exchange resin is always kept in a uninterrupted condition has not yet been available because of many mechanical and economical problems involved.

For this reason, even semicontinuous commercial methods are usually called "continuous methods" and typical examples of these methods are the Higgins method disclosed in U.S. Pat. No. 2,815,322, the Robert Potor method [Chemical Week, June 9, pages 74 to 76 (1959)], and that disclosed in the Japanese Patent Publication No. 5104 of 1963.

According to these methods, differing from that using the conventional fixed bed type, portions of the resin layer which have decreased their ion exchange ability are removed from the ion exchange treating zone and sent to a regeneration system. Concurrently with this removal, a regenerated resin of a quantity equal to that removed is supplementarily added to the ion exchange treating region from the regenerating system, thus assuring ion exchange treatment with the minimum quantity of the charged resin that does not leak ions. With this system, since portions of the resin that have lost their exchange ability do not stay in the resin bed for a long period, an apparatus with the same quantity of charge can treat a relatively large quantity of the liquid with high efficiencies. This also greatly improves the efficiency of regeneration. Furthermore, variation with time in the quality of the liquid being treated is small, so that this system is suitable for treating liquids of high ion concentrations with easy control.

However, in the above-described method of ion exchange treatment of the moving bed type, the tendency of mechanically crushing the resin due to friction and contact with valves becomes large, and as the treating capacity is increased, increase in the diameter of the treating column results in nonuniform packing of the resin as well as nonuniform distribution of the flow of the liquid to be treated, thus causing uneven ion exchange of the liquid.

SUMMARY OF THE INVENTION

This invention contemplates an improvement in the construction of the lower portion of the ion exchange column such that a predetermined quantity of the spend resin is separated from the resin bed by means of liquid jets. The invention also contemplates a combination of a novel regenerating system with the improved ion exchange column to carry out continuous ion exchange treatment.

An object of this invention is to provide a novel ion exchange apparatus of the counterflow moving bed type wherein crushing of the ion exchange resin is negligibly small and the flow of a large quantity of the liquid being treated can be made uniform.

Another object of this invention is to provide a novel counterflow moving bed type ion exchange column in which a predetermined quantity of the spent resin can be readily separated from the resin bed and transferred to a regenerating system by the action of liquid jets.

A still further object of this invention is to provide a novel resin regenerating system suitable for continuous operation.

According to a preferred embodiment of this invention there is provided a counterflow moving bed type ion exchange column wherein the ion exchange resin is charged into the upper portion of the column so as to descend as a moving bed and be successively discharged from the bottom of the tower, whereas the liquid to be treated is admitted into the column from the bottom thereof to contact the ion exchange resin in a counterflow fashion and is then discharged from the top of the tower, the ion exchange column being characterized in that at the upper portion of the column, there are provided a substantially horizontal filter in the form of a wire net, for example, for the liquid to be treated, a resin charging chamber immediately beneath the filter, and a supporting plate below the charging chamber; that an inlet pipe for the ion exchange resin is opened toward bottom near the center of the filter for the liquid to be treated; that an ion exchange chamber is formed beneath the supporting plate; that a substantially horizontal perforated resin supporting plate is provided below the ion exchange chamber; that a resin separating chamber is provided beneath the resin supporting plate; that separating nozzles and collecting nozzles are provided in the resin separating chamber; and that a resin discharge pipe is opened upwardly at the center of the bottom of the resin separating chamber.

Another aspect of this invention lies in an ion exchange treating apparatus comprising a combination of the above-described ion exchange column with a washing column to wash spent resin discharged from the ion exchange column, and a regenerating and rinsing column wherein the spent resin discharged from the washing column is subjected to regeneration treatment and rinsing and is then returned to the ion exchange column. One form of the regenerating and rinsing column comprises a lower filter in the form of a wire net, a lower filtering chamber, an inlet pipe upwardly opened near the center of the lower filter, a distributing pipe at an intermediate portion of the column to introduce and distribute a regenerating agent, and a discharge pipe located above the distributing pipe to collect and discharge spent rinsing water. As the upper portion of the regenerating and rinsing column, there are provided an upper filter, an upper filtering chamber, and a resin transfer chamber between the upper end of the resin charged in the column and the upper filter. A transfer pipe for transferring the regenerated and rinsed resin is provided to extend through the upper filter to open near the upper end of the charged resin. An inlet pipe for the rinsing water is connected to the upper filtering chamber while a discharge pipe for the spent regenerating agent is connected to the lower filtering chamber.

BRIEF DESCRIPTION OF THE DRAWING

For a more complete understanding of this invention reference may be had to the following detailed explanations in connection with the accompanying drawing in which:

FIG. 4 is a diagrammatic longitudinal section of a regenerating system embodying this invention; and FIG. 5 is a diagram showing a modified regenerating system.

DESCRIPTION OF PREFERRED EMBODIMENTS

Figure 1:
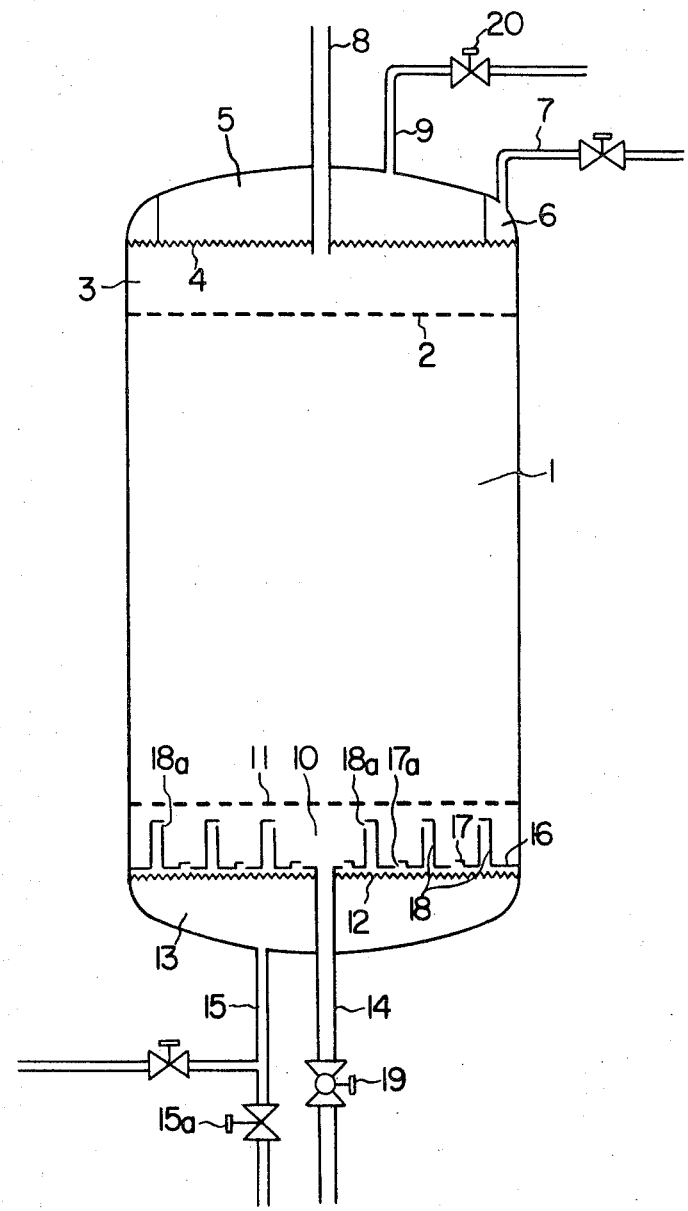
FIG. 1 is a diagram showing a longitudinal section of an ion exchange column of the counterflow moving bed type embodying this invention.

Referring now to the accompanying drawing, the ion exchange treating column shown in FIG. 1 comprises an ion exchange region 1 positioned between a separating chamber 10 and a charging chamber 3. A perforated charge supporting plate 11 is provided between ion exchange region 1 and separating chamber 10 while a charge supporting plate 2 is provided between charging chamber 3 and the ion exchange region. Each of supporting plate 11 and charge supporting plate 2 is a perforated plate having a plurality of uniformly distributed perforations throughout the entire surface thereof so that the resin can pass through the plate together with the liquid to be treated. At the upper end of charging chamber 3, and if desired, also at the lower end of separating chamber 10, there are provided filters 4 and 12 preferably in the form of wire nets which pass liquid but not resin and are made of wire nets of a metal, such as stainless steel or preferably a plastic such as polyvinyldene chloride, e.g., "Saran" sold by Asahi Dow Co., Japan. In order to remove the liquid accompanying the resin transferred from a regenerating system to be described later and to prevent such liquid from entering into ion exchange region 1, an annular accompanying liquid filtering chamber 6 is provided around the inner periphery of the ion exchange column. If desired, the space 5 within the annular filtering chamber may be used to temporarily accommodate the treated liquid.

Figure 2:
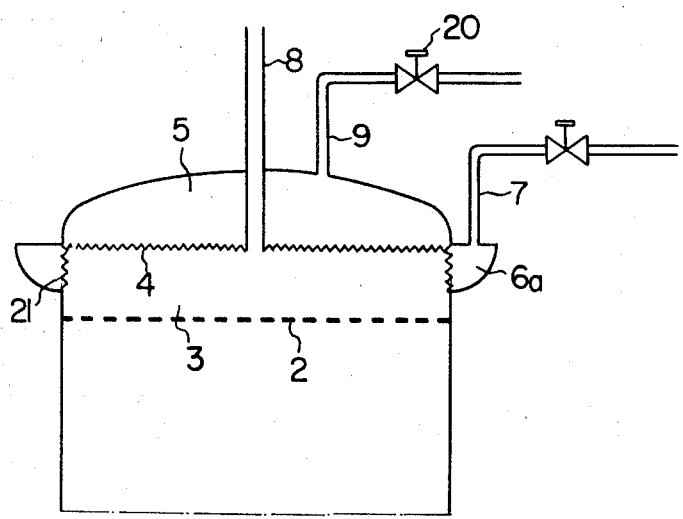
FIG. 2 is a longitudinal section of the upper portion of a modified ion exchange column.

As shown in FIG. 1, the peripheral portion of the filter 4 may be used as the filter element for accompanying liquid filtering chamber 6. Alternatively, as shown in FIG. 2 an annular filtering chamber 6a may be provided to surround the ion exchange column. In this modification a wire net 21 acting as a filter is provided between filtering chamber 6a and charging chamber 3.

A plurality of separating nozzles 18 and a plurality of collecting nozzles 17 are provided on a partition plate 16 contained in separating chamber 10. Where it is desired to supply the liquid or water to be treated to respective nozzles at a constant pressure, a liquid filter 12 and a liquid distributing chamber 13 may be provided beneath partition plate 16. By proper design it is possible to apply different liquid pressures to different nozzles.

In order to admit and discharge the ion exchange resin, a resin inlet pipe 8 is provided to open downwardly at the center of filter 4, and a downwardly extending discharge pipe 14 is connected to the center of the partition plate 16.

Figure 3:
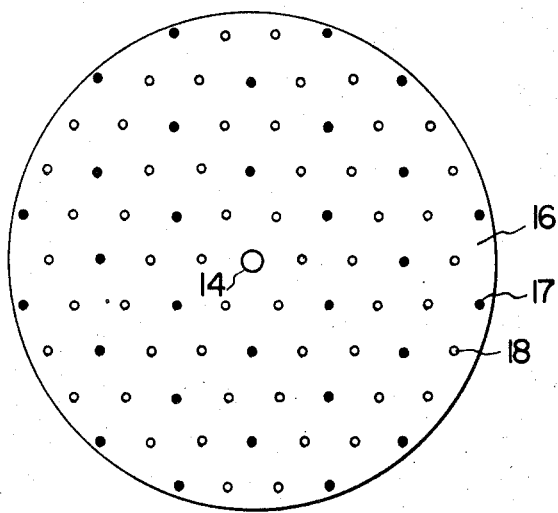
FIG. 3 is a plan view illustrating one example of the arrangement of separating nozzles and collecting nozzles on a partition plate.

As shown in FIG. 3, separating nozzles 18 and collecting nozzles 17 are so arranged on partition plate 16 that they have a definite mutual relationship and are uniformly distributed over the cross section of the column.

Each of the separating nozzles 18 extends axially close to the lower surface of supporting plate 11 and is provided with an ejecting port 18a near its upper end. It is advantageous to arrange the direction of these plurality of ejecting ports 18a in a manner such that, normally, they eject the liquid to be treated in the tangential direction of a circle about the axis of resin discharge pipe 14 positioned at the center of the partition plate 16 and that all liquid streams circulate in the same direction, whereby the ejected liquid whirls along the lower surface of supporting plate 11 at a suitable circumferential speed thus washing away the resin from the lower side of the supporting plate. By this whirling liquid, the spent resin is removed from the bottom of the resin bed and is caused to precipitate on the partition plate 16. The liquid to be treated flows into the resin bed above supporting plate 11 through perforations thereof.

Each of the collecting nozzles 17 has an ejecting port 17a directed toward the center of the bottom of separating chamber 10 to radially eject the liquid to be treated. The resin which has been removed from the lower side of supporting plate 11 is moved toward the center by the water flow ejected from the collecting nozzles and is then discharged through discharge pipe 14 admixed with a portion of the liquid to be treated. Although the remaining portion of the liquid ejected from the collecting nozzles flows into the resin bed above supporting plate 11 through separating chamber 10 and through perforations of the supporting plate, the quantity thereof can be adjusted to a value not to interfere with precipitation and discharge of the resin separated by nozzles 18. It is to be understood that the arrangement of various nozzles and their direction of ejection may be varied to assure efficient separation and precipitation of the resin.

The illustrated ion exchange column operates as follows. Prior to the passage of the liquid, the ion exchange resin is charged to fill all of charging chamber 3, ion exchange region 1 and separating chamber 10. Upon admission of the liquid through inlet pipe 15, the spent resin in the separating chamber 10 is discharged through discharge pipe 14 by the above described action of separating nozzles 18 and collecting nozzles 17. At this time a valve 19 included in the discharge pipe is opened. When all of the spent resin in separating chamber 10 has been discharged, valve 19 is closed to feel all of the liquid supplied to separating chamber 10 into ion exchange region 1. Alternatively, valve 19 may be partially opened to use a portion of the liquid to transfer the spent resin to the regenerating system. The liquid can also be used to remove suspended solids adhering to the spent resin.

The liquid flowing into ion exchange region 1 through perforations of supporting plate 11 functions to urge upwardly the resin bed. For this reason, during upward flow of the liquid, the resin will not drop down into separating chamber 10. For example when the liquid is passed upwardly at a rate of 50 to 60 m³/hour, the resin bed contained in ion exchange region 1 and charging chamber 3 is urged upwardly by the liquid, and particles of the resin, having an average particle size of 0.4 mm, for example, are caused to contact each other to form a so-called dense bed. Thus the interstices between adjacent particles are decreased, thus increasing the efficiency of ion exchange. While flowing through the resin bed, the liquid or water is subjected to ion exchange treatment, thus producing treated liquid. If, at this time, the distribution of the flow quantity were not uniform, the ion exchange region would not assume horizontal layers with the result that the quality of the treated liquid would not be uniform. However, as separating plate 11 and resin supporting plate 2 function to provide uniform flow of the liquid, the above described problems can be eliminated. By providing filtering chamber 5 above filter 4 and by providing a plurality of discharge pipes 20 uniformly distributed on the top of the treating column instead of a single pipe as illustrated, more advantageous results can be obtained.

As described before, while the liquid is continuously passed upward, the resin bed in the ion exchange region or band is urged upwardly, so that when the breakthrough point reaches the upper end of the ion exchange bed, leakage of ions begins. Consequently, passage of the liquid should be terminated before commencement of the ion leakage, and the regenerated and rinsed resin must be supplementarily supplied. In order to assure continuous operation over a long period it is necessary to limit the interval of liquid passage for one cycle so that the distance of shift of the ion exchange layer will be substantially commensurate with the quantity of the resin in separating chamber 10 or the quantity supplementarily supplied to the charging chamber. Thus, the dimensions of charging chamber 3 and of separating chamber 10 are determined dependent upon the period of liquid passage, quantity of the liquid passed, ion content of the liquid being treated, and like parameters. Conversely, where various liquids are supplied to an exchange column with chambers 3 and 10 of predetermined dimensions, the period of liquid passage and the quantity of the liquid should be suitably varied to ensure stable operation over a long period.

Upon completion of one period of liquid passage, supply of the liquid through inlet pipe 15 is stopped, and the liquid which has been treated in then caused to flow through the exchange column in the opposite direction, that is, from upper chamber 3 to lower distributing chamber 13, to transfer the spent resin at the bottom of exchange region 1 into separating chamber 10 through perforations of supporting plate 11. At this time a drain valve 15a is opened to discharge the liquid in chambers 10 and 13. As a result, the resin bed bodily descends like a piston until separating chamber 10 is filled with the spent resin, and the resin formerly charged in upper charging chamber 3 descends into the exchange region through perforations of supporting plate 2, thus emptying the charging chamber. The regenerated resin is supplied to charging chamber 3 together with accompanying liquid through inlet pipe 8. As the liquid accompanied by the regenerated resin is discharged through annular filtering chamber 6 and discharge pipe 7, it flows radially outwardly along horizontal filter 4 so that the regenerated resin is spread and charged in charging chamber 3 in a uniform layer and supply of the regenerated resin is automatically stopped. Now the ion exchange column is ready to start a new cycle of treating operations. In this manner, a quantity of resin just sufficient to fill chamber 3 or 10 is shifted through the ion exchange column.

As is well known in the art, the activity of the ion exchange resin contained in the region 1 decreases gradually toward the bottom. It is desirable that layers of different activity be horizontal and that each layer have uniform thickness. In the absence of perforated supported plate 2, the stream of liquid supplied through pipe 8 together with regenerated resin has a tendency to disturb uniform distribution of the ion exchange resin in the uppermost portion of the region 1. However, provision of perforated supporting plate 2 and annular filtering chamber 6 assures uniform distribution of the ion exchange resin. In other words, perforated supporting plate 2 serves as a rectifier to form superposed horizontal layers of resin of uniform thickness but of different activity.

Thus, with the novel ion exchange column, without using any mechanical means, all operations including separation of the spent resin, transfer thereof, descending of the resin bed, and charging of the regenerated resin are performed by controlling the liquid flow. Accordingly, crushing of the resin due to opening and closing valves and the resultant loss of the resin can be completely avoided, thus eliminating or reducing defects of the apparatus due to crushed resin. In addition, as division of the spent resin and charging of the regenerated or activated resin are performed by unique mechanisms to form uniform layers, the resin bed in the ion exchange region is always packed uniformly, thus ensuring uniform flow of the liquid to be treated. As a consequence, the ion exchange ability of any resin layer in the same horizontal plane is maintained at the same value.

Heretobefore, separation or division of the spent resin was done relatively satisfactorily in small apparatuses but was accompanied by various difficulties in large-sized apparatuses. In contrast, according to the novel apparatus, it is possible to divide a correct quantity of the spent resin always in a uniform layer irrespective of the diameter of the ion exchange column. Thus the apparatus can treat uniformly a large quantity of the liquid, typically water, over an extended period of time.

As the regenerating system to be combined with the above described ion exchange column, a continuous type regenerating system is more advisable than one of a batch type. While there have been proposed many types of such continuous type regenerating systems it is desirable to use a regenerating system as described hereunder in order to fully attain the objects of this invention.

FIG. 4 illustrates one example of the preferred regenerating systems. The system shown in FIG. 4 comprises a washing column 22 and a regenerating and rinsing tower 23. Washing tower 22 functions to wash away solids suspended in the liquid to be treated and adhering to the spent resin, and the spent resin together with the liquid is introduced into the bottom of washing column 22 through discharge pipe 14 at the bottom of the ion exchange column (FIG. 1), valve 19 and an inlet pipe 24. During the washing operation valve 27 is closed, and a valve 26 is opened so that the liquid discharged from inlet pipe 24 flows upwardly to wash the spent resin by an upward stream. Solids removed from the spent resin in this manner are discharged through a discharge pipe 25 and valve 26 together with the liquid. Thus, it will be noted that washing column 22 acts as a backwash device.

After washing, the clean resin is transferred to regenerating and rinsing column 23 by the liquid supplied through pipe 24 by opening valve 27. Where the liquid supplied through inlet pipe 24 is not sufficient to create sufficient pressure to transfer the resin to column 23, an additional pipe 28 with a valve 29 may be provided to increase the liquid pressure. When transferring the washed spent resin to the regenerating and rinsing column through pipe 30, it is preferable to supply an additional quantity of the liquid to the bottom of column 23 through a pipe including a valve 49 to promote upward flow of the resin in column 23. Where it is not desirable to use the liquid to be treated in the washing and regenerating system, a portion of the liquid treated by the ion exchange column may be used.

Preferably, regenerating and rinsing column 23 is in the form of an elongated cylinder including an upper filtering chamber 40, a resin transfer chamber 34, a rinsing portion 33, a substituting portion 32, a regenerating portion 31, and a lower filtering chamber 39. Normally the column is filled with resin up to a level just below the resin transfer chamber. A filter 36 in the form of a wire net is provided between upper filtering chamber 40 and resin transfer chamber 34, and a pipe 38 for collecting rinsing water is located between rinsing portion 33 and substituting portion 32, pipe 38 being provided with a plurality of perforations and covered by a wire net of metal or synthetic resin. A distributing pipe 37, identical to pipe 38, is located between substituting portion 32 and regenerating portion 31 to admit a suitable regenerating liquid. Further, a lower filter 35 in the form of a wire net is provided between regenerating portion 31 and lower filtering chamber 39. A transfer pipe 41 for the regenerated and rinsed resin is provided to extend through upper filtering chamber 40 and filter 36 to open into a space above the upper level of the resin in rinsing portion 33. Inlet pipe 30 for the spent resin extends upwardly through lower filtering chamber 39 and lower filter 35 to open upwardly near the center thereof. A rinsing water inlet pipe 43 including a valve 47 is connected to the upper filtering chamber 40, while a pipe 42 for discharging the spent regenerating agent is connected to the bottom of lower filtering chamber 39.

In operation, as the washed spent resin is forced into the lower portion of the regenerating and rinsing column, the resin bed contained therein is wholly moved upwardly by an amount equal to that divided at a time in separating chamber 10 in the ion exchange treating column shown in FIG. 1, thus shifting the resin in the upper portion of rinsing portion 33 into resin transfer chamber 34. The resin in resin transfer chamber 34 is then discharged through transfer pipe 41 to the ion exchange column shown in fIG. 1 by the water supplied from rinsing water inlet pipe 43.

When combining the above disclosed regenerating and rinsing column with the ion exchange column, resin transfer pipe 41 may be directly connected (or through a valve) to resin inlet pipe 8 (FIG. 1).

The volume of the resin in column 23 often varies from 10 to 15 percent dependent upon the type and concentration of the liquid with which it comes in contact. Consequently, the volume of the resin in the column varies during operation. For this reason, in conventional continuous type regenerating apparatus, hunting or interruption of resin transfer often occurred.

With the novel apparatus above described, variation in the quantity of resin can be reduced by varying the period of operating steps shown in table 1 below to increase or decrease the quantity of resin circulated per hour. However, this measure is not sufficient to reduce to zero the variation in the resin quantity.

To solve this problem and to enable smooth continuous operation over a long period, the volume of resin transfer chamber 34 is selected to be equal to the volume of the resin separated at a time in separating chamber 10 plus the maximum variation in the total volume of the resin contained in the system. It is advantageous to provide peep windows 48 for the resin transfer chamber to see the quantity of the resin contained therein.

Upon completion of resin transfer, valve 46 in water collecting pipe 38 is opened to discharge rinsing water. Concurrently therewith, rinsing water is admitted through inlet pipe 43 to rinse the resin contained in rinsing portion 33. While a major portion of the rinsing water is exhausted through water collecting pipe 38, a portion thereof is sent into regenerating portion 31 via substituting portion 32 to prevent the regenerating agent from entering into rinsing portion 33, thus preventing the loss of the regenerating agent. The portion of the rinsing water entering into the regenerating portion acts as a diluent for the regenerating agent.

Regeneration of the spent resin is initiated concurrently with the rinsing operation. The regenerating agent which has been diluted to a suitable concentration flows into the resin bed in regenerating portion 31 through a plurality of perforations of distributing pipe 37 and then flows toward the bottom. Injection of the regenerating agent is continued for a suitable period in the fore half of the regeneration period, and thereafter the injected regenerating agent is forced out of the column by the diluent water and the liquid from the washing column, thus preventing the spent regenerating liquid from flowing in the opposite direction during transfer of the regenerated resin. The liquid to be treated, introduced into regenerating portion during transfer of the spent resin, can be discharged through discharge pipe 42 and valve 44 together with the spent regenerating agent.

The quantity of the resin contained respectively in the regenerating portion and the rinsing portion is preferably equal to several times the quantity taken out of the ion exchange column at a time. Thus, each time a predetermined quantity of the spent resin is admitted into the bottom of column 23, the level of the resin bed in the regenerating portion as well as the rinsing portion rises stepwisely, thus assuring a multiple stage counterflow type regeneration and rinsing. In this manner, both the regenerating agent and rinsing water are utilized effectively to provide economical regeneration and rinsing with high efficiencies.

In the regeneration system, also, since movement and stopping of the resin are effected by liquid flow, the continuous ion exchange treating apparatus comprising the combination of this regeneration system and the above described ion exchange column can operate stably and continuously over a long period because the percentage of crushed resin is low and because the resin transfer chamber has sufficient space to accommodate an increase in the volume of the resin due to its swelling, which caused hunting in the resin transfer in the prior art apparatus. When combined with such a unique regenerating column, the ion exchange column embodying this invention can operate very satisfactorily with extremely high efficiencies.

The table below illustrates various operational steps of the combined apparatus. Where unit operations are controlled automatically by controlling various values required for performing respective unit operations by means of a timer and other necessary metering instruments, the novel apparatus can perform the so-called automatic continuous ion exchange treatment.

"Diaion SK1B" was charged into an ion exchange treating column identical to that shown in FIG. 1, and the column was connected to a conventional batch type regenerating system to treat four tons of water (for industrial use), whereupon the following results were obtained.

As the total quantity of ions in the water to be treated was about 150 p.p.m. under normal conditions but reaches 200 p.p.m. under abnormal conditions, each value in terms of calcium carbonate, the quantity of the resin divided at a time was set at 12 liters, and the period of operation was set at 40 minutes under normal conditions. Under normal conditions, these parameters were suitably modified to correspond to the total ion quantity of the water being treated. After a continuous runover one month, no abnormal condition was noted in the ion exchange treating column, and division and charging of the resin in a uniform layer were accomplished each time. Treated water was sampled at intervals of 30 minutes, and it was found that the quality of water was substantially constant throughout the entire period, that is, slightly acidic water of about pH 3 was obtained. When the treated water was passed through an anion exchange resin column, pure water having a specific resistance of more than 200,000 ohms was obtained.

To regenerate the spent resin, 6 percent hydrochloric acid was used with a ratio of 150 grams per liter of the spent resin.

EXAMPLE 2

The same process as in example 1 was repeated except for the use of an ion exchange column as illustrated in FIG. 1 and a regenerating system identical to that shown in FIG. 4.

The water to be treated was the same industrial water as that used in example 1. In this example 2, however, in addition to the variation of the total ion quantity described above, sodium ions varied from 25 to 75 percent, for example. To meet these variations, the capacity of the resin transfer chamber of the regenerating and rinsing column was increased from 12 liters (the quantity of the divided resin each time) to 18 liters and the operating period was varied from the set valve 40 minutes over a range of ±5 minutes, whereby variations in the volume of the entire charged resin was absorbed. Results of continuous operation over one month showed that, irrespective of substantial change in the composition of the ions in the water being treated, no trouble was observed either in the ion exchange system or in the regenerating system, and substantially the same results as those in example 1 was obtained. The quantity of the regenerating agent used was reduced to 100 grams per liter of resin shifted.

EXAMPLE 3

The novel apparatus was applied to a system requiring a water purifying capacity of 75 metric tons per hours. The

OPERATIONAL STEPS

| | Exchange column | | |
|---|---|---|---|
| | Pass liquid | Resin precipitates | Charge resin |
| Washing tower | Wash | Settling | Transfer resin. Wait. |
| Regenerating and rinsing column: | | | |
| Regenerating portion | Inject regenerating agent. | Force out regenerating agent. | Charge resin Do. |
| Rinsing portion | Rinse | do | Transfer resin. |
| | ←――――――――――――― One cycle ―――――――――――――→ | | |

While examples of treatments effected by the novel apparatus will now be set forth, it should be understood that the invention is not limited to the specific examples given but can be modified in various ways without departing from the spirit of the invention.

EXAMPLE 1

A quantity of a cation exchange resin sold by Mitsubishi Chemical Industries Ltd., Tokyo, Japan, under the trade name apparatus comprises a cation exchange column and an anion exchange column each combined with a respective regenerating system and a decarboxylation column connected between the two columns. Each of these columns had a construction identical to that shown in FIG. 1, having an inner diameter of 1,400 mm. and a length of the resin layer of 1,100 mm. A cation exchange resin and an anion exchange resin respectively sold by said Mitsubishi Chemical Industries Ltd. under trade names "Diaion SK1B" (a strongly acidic cation exchange resin) and "Diaion SA1OB" (a strongly basic anion exchange resin) were charged into their respective columns.

Each of the regenerating systems had a construction identical to that shown in FIG. 4, and the regenerating and rinsing column for the cation exchange resin had an inner diameter of 280 mm., a length of the resin layer of 9.5 meters, and a volume of the resin transfer chamber 120 liters. The regenerating and rinsing column for the anion exchange resin was designed to have an inner diameter of 370 mm., a length of the resin layer 10.5 meters, and a volume of the resin transfer chamber of 225 liters.

The water being treated was passed through the cation exchange column at a rate of 80 m$^3$/hr., and an intermediate water at a rate of 78m$^3$/hr. was obtained. The quantity of the spent resin divided each time was 80 liters which was discharged within 5 to 6 minutes.

The reason for the quantity of the intermediate water being less than that of the original water is that a portion of the original water was used to wash and transfer the spent resin and that a portion of the intermediate water was used to dilute the regenerating agent.

The resulting intermediate water was passed through the anion exchange column via the decarbonater column, the quantity of the spent resin separated each time in the anion exchange column being 150 liters, which was discharged within 9 to 10 minutes.

The operational period of each column was adjusted to a value ranging from 20 to 25 minutes.

The cation content of the water being treated was 105 to 125 p.p.m. in terms of $CaCO_3$, the anion content was 85 to 115 p.p.m. (measured after decarbonation), and the $SiO_2$ content was 15 to 25 p.p.m. also in terms of $CaCO_3$. However, the output from the anion exchange column was essentially pure water containing less than 0.05 p.p.m. of $SiO_2$ and having a specific resistance of more than 200,000 ohms.

The apparatus of this example was operated continuously for two months without any trouble in any column.

FIG. 5 shows a modified regenerating and rinsing system for the spent resin comprising a backwash column 51, a counterflow type regenerating column 52, and a counterflow type rinsing column 53. The spent resin from the bottom of the ion exchange column is supplied to backwash column 51 through pipe 14 and valve 54 to be backwashed by the upward flow of the liquid. Waste liquid is discharged from the backwash column through valve 55. The backwash operation of the spent resin can be performed in a relatively short period. Then valves 56 and 57 are opened to transfer the washed spent resin into the regenerating column 52 by means of the liquid supplied through valve 56, which may be the original or not yet treated liquid.

A suitable regenerating agent or liquid is supplied to the bottom of regenerating column 52 from a reservoir 58 through a pump 59, a valve 60, and a filter 61 at the bottom of the column. The regenerating liquid then flows upwardly through a resin bed in column 52 and is finally discharged through a filter at the top of the column and a valve 63. The regenerated resin is then transferred to rinsing column 53 which, together with column 52, is arranged in a U-shpaed configuration. Connector 64 between the two columns 52 and 53 has a large cross section sufficient to permit free transfer of the regenerated resin. For example the cross section of connector 64 may be the same or slightly smaller than that of column 52 or 53. The regenerated resin transferred into the rinsing column is rinsed with water, which may be the water treated by the ion exchange column shown in FIG. 1 and circulated by a pump 65 through a valve 66, an upper filter 67, the resin bed in column 53, a lower filter 68 and a valve 69. The regenerated and rinsed resin is then returned to the ion exchange column (FIG. 1) through pipe 8. Transfer of the resin through backwash column 51, regenerating column 52, and rinsing column 53 and supply of the regenerating agent and rinsing water can be carried out automatically by controlling various valves in accordance with a prescribed program.

The regenerating system shown in FIG. 5 is characterized in that counterflow type regeneration column 52 in which the spent resin flows downwardly and counterflow type rinsing tower 53 in which the regenerated resin flows upwardly are arranged in a U-shaped configuration by interconnecting the lower ends thereof by means of a connector 64 of large cross section and that backwash column 51 is located above the regenerating column. This arrangement not only simplified the resin chambers and resin discharge mechanism for respective columns but also eliminates a valve from the connector, thus preventing crushing of the resin due to operation of the valve. Moreover, as backwash column 51 functions to remove crushed resin, solid impurities, and gas from the spent resin, there is no variation in the pressure drop of the resin bed, thus substantially eliminating variations in the flow quantity and the quality of the treated liquid. Although the regenerating and rinsing columns are formed as an integral unit, as they are combined to have a U-shaped configuration, the overall height of the system is not excessive. The upper end of column 53 is bulged to provide a resin transfer chamber of sufficient volume, in exactly the same manner as that described in connection with FIG. 4.

EXAMPLE 4

This example illustrates an application of this example to a system having a water treating capacity of 120 tons per hour. In this example, the system comprised a cation exchange column, an anion exchange column, regenerating systems respectively associated with those columns, and a decarbonater column connected between the anion and cation exchange columns. Each of these ion exchange columns had a construction identical to that shown in FIG. 1, with an inner diameter of 1,850 mm. and a height of the resin layer of 1,100 mm. These columns were respectively filled with a cation exchange resin "Diaion SK1B" and an anion exchange resin "Diaion SA20B", both sold by Mitsubishi Chemical Industries Ltd.

Each of the regenerating systems had a construction identical to that shown in FIG. 5. The inner diameter of the regenerating column for the cation exchange resin was 495 mm., and the height of the resin layer was 4.9 m. The water rinsing column had an inner diameter of 560 mm. and a height of the resin layer of 3.0 m., and the volume of the resin transfer chamber was 310 liters. The regenerating column for the anion exchange resin had an inner diameter of 605 mm., and a height of resin layer 6.5 m., and the water rinsing column had an inner diameter of 750 mm., a height of resin layer of 4.0 m., and a volume of the resin transfer chamber of 615 liters. Water to be treated was passed through the cation exchange column at a rate of 140 m$^3$/hr., and intermediately treated water was obtained at a rate of 132 m$^3$/hr. Spent resin was separated in an amount of 205 $\iota$ each time, and the separated resin was discharged in 8 to 10 minutes. The reason for the quantity of the intermediately treated water being less than that of the original water was that a portion of the original water was used to wash and transfer the spent resin and that a portion of the intermediately treated water was used as a diluent for the regenerating agent. The intermediately treated water was passed to the anion exchange column through the decarbonater column at a rate of 132 m$^3$/hr., and treated water or substantially pure water was obtained at a rate of 120 m$^3$/hr. 410 liters each time of spent resin was separated from the anion exchange column, and the separated spent resin was discharge in 13 to 15 minutes. A portion of the intermediately treated water was used to transfer and wash the spent resin, and a portion of the pure water was to dilute the regenerating agent and to rinse and transfer the regenerated resin. The operating cycles of these two ion exchange columns were adjusted to be in a range of from 25 to 30 minutes.

The original water contained 120 to 130 p.p.m. of cations in terms of $CaCO_3$, 94 to 105 p.p.m. of anions (when measured after decarbonation), and 15 to 25 p.p.m. of $SiO_2$ also in terms of $CaCO_3$, whereas the water discharged from the anion exchange column was substantially pure water containing less than 0.1 p.p.m. of SiO$_2$ a and having a resistivity of more than 100,000 ohms.

The apparatus of this example was also operated continuously for two months without any defect in any column.

We claim:

1. In a counterflow moving bed type ion exchange column wherein an ion exchange resin is charged into the upper portion of said column to flow downwardly as a moving bed, and wherein a liquid being treated is supplied into the bottom of said column to flow upwardly through said bed of said ion exchange resin, the improvement which comprises a perforated supporting member provided at the lower end of said moving bed, a plurality of liquid nozzles located below said perforated supporting member to separate a predetermined quantity of spent resin from said moving bed through said perforated supporting member, and means to discharge said separated spent resin.

2. A counterflow moving bed type ion exchange column wherein an ion exchange resin is charged into the upper portion of said column to flow downwardly as a moving bed, and wherein a liquid being treated is supplied into the bottom of said column to flow upwardly through said bed of said ion exchange resin, said column comprising an essentially horizontal filter near the upper end of said column, a resin charging chamber beneath said filter, an ion exchange region beneath said resin charging chamber, a first perforated resin supporting member interposed between said resin charging chamber and said ion exchange region, an inlet pipe for said ion exchange resin, said pipe opening into said resin charging chamber, a second perforated resin supporting member at the bottom of said ion exchange region, a resin separating chamber beneath said second perforated resin supporting member, a plurality of liquid nozzles disposed in said separating chamber to separate a predetermined quantity of spent resin from the resin bed contained in said ion exchange region, means to discharge said separated spent resin, and means connected to said column to cause a liquid to be treated to flow upwardly through said separating chamber, said ion exchange region and said resin charging chamber.

3. The ion exchange column as claimed in claim 2 wherein said ion exchange resin is supplied through said inlet pipe to said resin charging chamber together with an accompanying liquid from a regenerating system, and wherein means is provided for said resin charging chamber to remove said accompanying liquid.

4. The ion exchange column as claimed in claim 3 wherein said inlet pipe extends through substantially the center of said filter to open into said resin charging chamber, and said means for removing said accompanying liquid is in the form of an annulus near the periphery of said filter.

5. The ion exchange column as claimed in claim 2 wherein said resin separating chamber contains a plurality of axially extending nozzles, each of said nozzles having a liquid ejecting port adjacent the lower surface of said second perforated resin supporting member, and a plurality of collecting nozzles of relatively short axial length, each of said collecting nozzles having a liquid ejecting port directed to said resin discharge means.

6. The ion exchange column according to claim 1 wherein each of said liquid nozzles has a liquid ejection nozzle directed in the tangential direction with respect to a circle having its center at the axis of said column whereby to create a whirling motion of the liquid below said perforated supporting member.

7. A continuous type ion exchange treating apparatus comprising a combination of a counterflow moving bed type ion exchange column, a washing column to wash the spent resin discharged from said ion exchange column, and a counterflow type regenerating column, said regenerating column comprising, an upper filter, a lower filter, an inlet pipe leading from said washing column and opening upwardly near the center of said lower filter, means located at an intermediate point of said regenerating column to admit a regenerating agent, a water collecting pipe located above said means for admitting said regenerating agent to collect and discharge rinsing water, an inlet pipe connected near the top of said regenerating column to admit said rinsing water through said upper filter, a transfer pipe connected between said ion exchange column and said regenerating column to transfer regenerated and rinsed ion exchange resin to said ion exchange column, and a discharge pipe connected to the bottom of said regenerating column.

8. The continuous type ion exchange treating apparatus according to claim 7 wherein said counterflow type regenerating column is provided with a resin transfer chamber at its upper end, and said transfer pipe extends through said transfer chamber, said transfer chamber having a volume larger than that of the resin transferred each time.

9. The apparatus according to claim 7 wherein said washing column and said regenerating column are connected in series across said ion exchange column so that said spent resin discharged from said ion exchange column is supplied to said regenerating column through said washing column together with a liquid being treated, and wherein means is provided to directly supply said liquid to the bottom of said regenerating column to assists upward flow of said resin therein.

10. The apparatus according to claim 7 wherein said washing column is of a backwash type and is positioned above said regenerating column.

11. The apparatus according to claim 7 wherein an upright regenerating column and an upright rinsing column are combined in a U-shaped configuration, wherein the spent resin is supplied to the upper end of said regenerating column to flow downwardly against the upward flow of a regenerating agent supplied to the bottom of said regenerating column, and wherein the regenerated resin is supplied to the bottom of said rinsing column to flow upwardly against the downward flow of a rinsing liquid supplied into the top of said rinsing column.

12. In apparatus for treating liquid by means of an ion exchange resin of the type including a counterflow moving bed type ion exchange column wherein the ion exchange resin is charged into the upper portion of said column to flow downwardly as a moving bed and wherein a liquid being treated is supplied into the bottom of said column to flow upwardly through said bed of said ion exchange resin and a counterflow type regenerating column wherein said ion exchange resin spent in said ion exchange column is regenerated and rinsed and said regenerated ion exchange resin is supplied to the upper portion of said ion exchange column, the improvement which comprises a separating chamber at the bottom of said ion exchange column, a plurality of liquid ejecting nozzles mounted in said separating chamber to separate and collect a predetermined constant quantity of spent ion exchange resin and to transfer said constant quantity to said regenerating column, and a resin transfer chamber provided at the upper end of said regenerating column, said resin transfer chamber having a volume sufficient to accommodate said predetermined quantity of said ion exchange resin whereby said constant quantity of resin is circulated through said ion exchange column and said regenerating column.

UNITED STATES PATENT OFFICE
CERTIFICATE OF CORRECTION

Patent No. 3,575,294      Dated April 20th, 1971

Inventor(s) Mamoru Hirowatari and Takeo Kawai

It is certified that error appears in the above-identified patent and that said Letters Patent are hereby corrected as shown below:

Column 1, line 18, change "(1959)" to --(1956)--; line 55, change "spend" to --spent--. Column 4, line 7, change "feel" to --feed--; line 62, change "in" to --is--. Column 8, line 12, change "normal" to --abnormal--; line 55, change "hours" to --hour--; line 68, change "comprises" to --comprised--. Column 9, line 59, change "U-shpaed" to --U-shaped--. Column 10, line 7, change "simplified" to --simplifies--; line 65, change "discharge" to --discharged Signed and sealed this 25th day of January 1972.

(SEAL)
Attest:

EDWARD M. FLETCHER, JR.      ROBERT GOTTSCHALK
Attesting Officer      Commissioner of Patents